US012766617B2

(12) United States Patent
Kocher et al.

(10) Patent No.: US 12,766,617 B2
(45) Date of Patent: Oct. 20, 2026

(54) SAW BLADE

(71) Applicant: Robert Bosch GmbH, Stuttgart (DE)

(72) Inventors: Martin Kocher, Solothurn (CH); Thomas Eipl, Bern (CH); Donghui Ding, Zuchwil (CH); Milan Bozic, Luterbach (CH); Daniel Grolimund, Zuchwil (CH); Daniel Saegesser, Langenthal (CH); Simon Berger, Muehlethurnen (CH)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 17/636,241

(22) PCT Filed: Aug. 13, 2020

(86) PCT No.: PCT/EP2020/072808
§ 371 (c)(1),
(2) Date: Feb. 17, 2022

(87) PCT Pub. No.: WO2021/037585
PCT Pub. Date: Mar. 4, 2021

(65) Prior Publication Data

US 2022/0331889 A1 Oct. 20, 2022

(30) Foreign Application Priority Data

Aug. 23, 2019 (DE) ..................... 10 2019 212 706.1

(51) Int. Cl.
*B23D 61/00* (2006.01)
*B23D 61/12* (2006.01)

(52) U.S. Cl.
CPC ......... *B23D 61/006* (2013.01); *B23D 61/123* (2013.01)

(58) Field of Classification Search
CPC ............................ B23D 61/006; B23D 61/123
See application file for complete search history.

(56) References Cited

U.S. PATENT DOCUMENTS 5,295,426 A * 3/1994 Planchon .................. B26B 7/00 83/846
6,401,342 B1 * 6/2002 Kloss ........................ B26B 7/00 30/277.4

(Continued)

FOREIGN PATENT DOCUMENTS

CN 102423816 A 4/2012
CN 102950332 A 3/2013

(Continued)

OTHER PUBLICATIONS

Boyd, Jamie, "fein multimaster plunge cut with saw blade," Sep. 13, 2012, youtube.com, avaiable on Feb. 12, 2025 at : https://www.youtube.com/watch?v=ShGRcbtSI7E (Year: 2012).*

(Continued)

*Primary Examiner* — Jonathan G Riley
(74) *Attorney, Agent, or Firm* — Maginot, Moore & Beck LLP

(57) ABSTRACT

The disclosure relates to a saw tool for use with a multi-functional machine tool which can be driven in oscillation. The saw tool has at least one main axis, at least one main body, and at least one cutting arm arranged on the main body transversely to the main axis, the cutting arm having a first cutting region and a second cutting region starting from the main axis in a direction pointing away from the main body and running at least substantially perpendicular to the main axis, said cutting regions arranged one behind the other, and directly adjacent to each other. The second cutting region is arranged on the first cutting region, on a side of the first cutting region furthest from the main body, and has a greater mass than the first cutting region.

13 Claims, 4 Drawing Sheets

(56) References Cited

U.S. PATENT DOCUMENTS

| | | | | |
|---|---|---|---|---|
| 6,434,835 | B1 * | 8/2002 | Grunikiewicz | B26D 7/086 30/277.4 |
| D479,107 | S * | 9/2003 | Rack | D8/20 |
| D485,140 | S * | 1/2004 | Rack | D8/20 |
| 6,802,127 | B2 * | 10/2004 | Thomaschewski | B26B 7/00 30/277.4 |
| D741,126 | S * | 10/2015 | Sis | D8/20 |
| 10,843,282 | B2 * | 11/2020 | Churchill | B23D 61/006 |
| 2002/0023357 | A1 | 2/2002 | Grunikiewicz et al. | |
| 2012/0144676 | A1 * | 6/2012 | Davidian | B25F 3/00 30/142 |
| 2013/0160631 | A1 | 6/2013 | Nagy et al. | |
| 2013/0227844 | A1 * | 9/2013 | Kazda | B23D 61/123 83/837 |
| 2017/0182570 | A1 * | 6/2017 | Dvorak | B27B 19/006 |
| 2018/0117687 | A1 * | 5/2018 | Rubens | B23D 51/10 |
| 2019/0240752 | A1 * | 8/2019 | Churchill | B26B 7/00 |
| 2020/0122347 | A1 * | 4/2020 | Maras | B26B 7/00 |

FOREIGN PATENT DOCUMENTS

| | | | | |
|---|---|---|---|---|
| CN | 103998193 | A | 8/2014 | |
| CN | 107856206 | A | 3/2018 | |
| CN | 208374346 | U | 1/2019 | |
| DE | 102009041114 | A1 * | 4/2011 | B23D 61/006 |
| DE | 10 2016 103 903 | A1 | 9/2017 | |
| EP | 3213847 | A1 * | 9/2017 | B23D 61/006 |
| WO | 2018/078000 | A1 | 5/2018 | |

OTHER PUBLICATIONS

Ask Jon Eakes, “Avoid Burning with an Oscillating Saw in plunge cutting, ” Mar. 10, 2011, youtube.com, avaiable on Feb. 12, 2025 at : https://www.youtube.com/watch?v=VJKzqZQObe4 (Year: 2011).*

International Search Report corresponding to PCT Application No. PCT/EP2020/072808, mailed Nov. 16, 2020 (German and English language document) (5 pages).

* cited by examiner

SAW BLADE

This application is a 35 U.S.C. § 371 National Stage Application of PCT/EP2020/072808, filed on Aug. 13, 2020, which claims the benefit of priority to Serial No. DE 10 2019 212 706.1, filed on Aug. 23, 2019 in Germany, the disclosures of which are incorporated herein by reference in their entirety.

BACKGROUND

WO 2018/078000 A1 already proposes a saw tool having at least one main axis, having at least one main body and having at least one cutting arm arranged on the main body transversely to the main axis, wherein the cutting arm has, starting from the main axis, in a direction directed away from the main body, in particular extending at least substantially perpendicularly to the main axis, a first cutting region and a second cutting region which are arranged one after the other, in particular so as to directly adjoin one another.

SUMMARY

The disclosure proceeds from a saw tool, in particular from an oscillation saw tool, in particular for use with a multifunctional machine tool that is drivable in oscillation, having at least one main axis, having at least one main body and having at least one cutting arm arranged on the main body transversely to the main axis, wherein the cutting arm has, starting from the main axis, in a direction directed away from the main body, in particular extending at least substantially perpendicularly to the main axis, a first cutting region and a second cutting region which are arranged one after the other, in particular so as to directly adjoin one another.

It is proposed that the second cutting region is arranged on the first cutting region on a side of the first cutting region that faces away from the main body, and has a greater mass than the first cutting region.

The expression "at least substantially perpendicularly" should be understood as meaning in particular an orientation of a straight line relative to another straight line or to a plane, wherein the straight line and the other straight line or the plane, in particular as seen in a projection plane, enclose an angle of 90° and the angle has a maximum deviation of in particular less than 8°, advantageously less than 5° and particularly advantageously less than 2°. Preferably, the saw tool is intended to be moved, in particular in oscillation about or along a drive axis of the sawing machine tool and/or an axis of movement of the saw tool, in particular in at least a state in which it is arranged on a sawing machine tool, in particular the multifunctional machine tool that is drivable in oscillation. Preferably, the saw tool comprises at least one saw toothing, which is arranged and/or integrally formed in particular along the main body and the cutting arm and forms a cutting edge. Preferably, the saw toothing extends, in particular at least largely, along a common side of the main body and of the cutting arm. Preferably, the saw tool, in particular the saw toothing, is intended to machine, in particular to saw, wood, metal and/or plastic. Preferably, the saw toothing is formed integrally with the main body and/or the cutting arm. The term "integrally" should be understood as meaning in particular at least connected by a material bond, for example by a soldering process, a welding process, an adhesive-bonding process, an injection-molding process and/or some other process that appears appropriate to a person skilled in the art, and/or advantageously formed in one piece, for example by being produced by casting and/or by being produced in a punching process and advantageously from a single blank.

Preferably, the saw tool has at least one connecting region for connecting the saw tool to a saw tool receptacle of the sawing machine tool. Preferably, the connecting region is formed integrally with the main body. Preferably, the connecting region is arranged on the main body on a side of the main body, in particular a side facing away from the cutting arm. In particular, the main body has a maximum thickness of less than 20 mm, preferably less than 15 mm, particularly preferably less than 10 mm and very particularly preferably less than 4 mm, in particular at least substantially perpendicularly to the main axis and/or at least substantially parallel to the axis of movement. In particular, the saw toothing has a maximum thickness of in particular less than 25 mm, preferably less than 20 mm, particularly preferably less than 15 mm and very particularly preferably less than 6 mm, in particular at least substantially perpendicularly to the main axis and/or at least substantially parallel to the axis of movement. Preferably, the saw toothing has a maximum length of less than 200 mm, preferably less than 100 mm and particularly preferably less than 75 mm, in particular of 70 mm. Particularly preferably, the axis of movement is oriented at least substantially perpendicularly to the main axis. Preferably, the axis of movement intersects the main axis at a point, in particular at a point within the connecting region.

A "main axis" of a component, in particular of the saw tool, of the main body and/or of the connecting region, should be understood as meaning in particular an axis which extends parallel to a longest edge of a smallest geometric cuboid that still just entirely encloses the object. The expression "at least substantially parallel" should be understood as meaning in particular an orientation of a straight line relative to another straight line or a plane, in particular as seen in a projection plane, wherein the straight line has an angular deviation of in particular less than 8°, advantageously less than 5° and particularly advantageously less than 2°, with respect to the other straight line or the plane. Preferably, the saw tool has a maximum longitudinal extent, oriented at least substantially parallel to the main axis, of in particular less than 250 mm, preferably less than 120 mm and particularly preferably less than 90 mm.

Preferably, the main body and the cutting arm are formed integrally. The term "integrally" should be understood as meaning in particular formed in one piece. Preferably, this one piece is produced from a single blank, a mass and/or by casting, particularly preferably in a punching process from one material. Preferably, the cutting arm extends, in particular as seen in the main extension plane of the main body, via an edge and/or side face, arranged in particular between the connecting region and the saw toothing, of the main body in a direction, away from the main axis, along the edge and/or side face. Preferably, the cutting arm has, in particular starting from the main axis, preferably as seen in the main extension plane of the main body, at least substantially perpendicularly to the main axis, a greater maximum transverse extent than the main body, in particular than a region of the main body that is arranged between the cutting arm and the connecting region. Preferably, the main body and the cutting arm have at least a common main extension plane. A "main extension plane" of a component, in particular of the cutting arm and/or of the main body, should be understood as meaning in particular a plane which is parallel to a greatest side face of a smallest imaginary cuboid that just still entirely encloses the structural unit, and in particular extends through the center of the cuboid. Preferably, the first cutting region and the second cutting region are formed within an extent of the cutting arm. Preferably, the cutting arm is formed, in particular entirely, by the first cutting region and the second cutting region. In particular, the saw toothing extends, in particular at least substantially transversely to the main axis, along an at least substantially entire length of the first cutting region and of the second cutting region along a common side of the first cutting region and of the second cutting region. Preferably, the first cutting region and the second cutting region are arranged, as seen in the main extension plane of the main body and/or of the cutting arm, along an axis oriented transversely, in particular at least substantially perpendicularly, to the main axis. Preferably, the first cutting region is arranged directly on one side of the main body. Preferably, the second cutting region is arranged directly on the first cutting region, on a side of the first cutting region facing away from the main body, along the axis oriented transversely, in particular at least substantially perpendicularly, to the main axis. In particular, the second cutting region is arranged on the main body only via the first cutting region. Preferably, the first cutting region and the second cutting region, as seen in the main extension plane of the main body and/or of the cutting arm, are arranged at a distance from the main axis and extend at least substantially entirely in a direction directed away from the main axis. It is also conceivable, however, for the main axis to intersect the first cutting region and/or the second cutting region, wherein in particular a side and/or edge of the main body that is arranged on the first cutting region is arranged at a distance from the main axis.

Preferably, the saw tool has at least one opposite arm, which is arranged in particular on the main body on a side of the main body that faces away from the cutting arm. In particular, the opposite arm is formed integrally with the main body. Preferably, the opposite arm and the cutting arm extend in opposite directions from the main body. Preferably, the opposite arm extends, in particular as seen in the main extension plane of the main body, via an edge and/or side face, arranged in particular between the connecting region and the saw toothing, of the main body in a direction, away from the main axis, along the edge and/or side face. Preferably, the opposite arm has, in particular starting from the main axis, preferably as seen in the main extension plane of the main body, at least substantially perpendicularly to the main axis, a smaller maximum transverse extent than the main body, in particular than a region of the main body that is arranged between the cutting arm and the connecting region. Preferably, the saw toothing is formed integrally or in one piece with the opposite arm. Preferably, the opposite arm, the main body and/or the cutting arm form, in particular as seen in a main extension plane of the main body, at least one common side, in particular along which the saw toothing extends, in particular on which the saw toothing is arranged on the opposite arm, the main body and the cutting arm. In particular, the saw toothing is formed integrally or in one piece with the opposite arm, the main body and the cutting arm. Preferably, the main body, the opposite arm and the cutting arm have a common main extension plane. In particular, the opposite arm has, along the cutting edge, in particular along a main extension axis of the opposite arm, a maximum length that corresponds in particular to at most 30%, preferably at most 20% and particularly preferably at most 10%, of a total length of the cutting arm. For example, the opposite arm has, along the cutting edge, a maximum length of less than 10 mm, preferably less than 8 mm and particularly preferably less than 6 mm, in particular of 5.18 mm. A "main extension axis" of a component, in particular of the opposite arm, of the saw toothing and/or of the cutting arm, should be understood as meaning in particular an axis which extends parallel to a longest edge of a smallest geometric cuboid that still just entirely encloses the component.

As a result of the configuration according to the disclosure of the saw tool, an advantageously high degree of stability in operation can be achieved. In particular as a result of the increased mass in the second cutting region, a resonance and/or natural frequency of the cutting arm can advantageously be changed. Since only individual frequencies can be excited by a saw frequency in operation, damping of the saw tool can be allowed as a result. Advantageously low loading of the saw tool while machining a workpiece can be achieved, in particular since advantageously a low level of vibration of the saw tool, in particular of the cutting arm, can be allowed. In particular in the case of alternating cutting and pressure forces acting on the saw tool, for example when the saw tool is used for freehand cutting and/or curved cuts, advantageously easy blade guidance and/or advantageously high cutting quality can be allowed.

Furthermore, it is proposed that the cutting arm has a greater maximum transverse extent within the second cutting region, in particular along at least an axis oriented at least substantially perpendicularly to a main extension axis of the cutting arm, in particular to a cutting edge, preferably the abovementioned cutting edge, than in the first cutting region. Preferably, the cutting arm has a greater maximum transverse extent, in particular maximum blade width, within the second cutting region, along at least an axis oriented at least substantially parallel to the main axis, than in the first cutting region. Preferably, the cutting arm has, in the second cutting region, a maximum blade width of in particular less than 20 mm, preferably less than 15 mm and particularly preferably less than 10 mm, in particular of 6.3 mm. Preferably, the cutting arm has, in the first cutting region, a maximum blade width of in particular less than 10 mm, preferably less than 7 mm and particularly preferably less than 5.5 mm. Alternatively or additionally, it is conceivable for the cutting arm to have a greater maximum transverse extent, in particular maximum thickness, within the second cutting region, along at least an axis oriented at least substantially perpendicularly to the main axis and the cutting edge of the saw toothing, than in the first cutting region. In particular, the cutting arm has a maximum thickness of in particular less than 20 mm, preferably less than 15 mm, particularly preferably less than 10 mm and very particularly preferably less than 2 mm, preferably within the first cutting region and the second cutting region, in particular at least substantially perpendicularly to the main axis and/or to the common side of the main body and of the cutting arm. It is conceivable for the cutting arm to have the same maximum thickness, preferably within the first cutting region and the second cutting region, as the main body. It is conceivable for the cutting arm to be configured such that a thickness of the cutting arm decreases within the second cutting region, at least partially as seen along the cutting edge, toward an end of the second cutting region that is remote from the first cutting region. Preferably, at least the connecting region, the main body and/or the cutting arm is/are formed at least largely from at least one material which is formed in particular as a metal. Alternatively or additionally, it is conceivable for the cutting arm to consist, in the second cutting region, at least partially of a further material which has in particular a higher density than the material, in particular one material of the first cutting region. An advantageously high degree of stability in operation of the saw tool can be allowed. Advantageously good damping of the saw tool can be allowed. Advantageously easy blade guidance and/or advantageously high cutting quality can be allowed.

Moreover, it is proposed that the first cutting region and the second cutting region have an at least substantially identical maximum length along an axis oriented at least substantially perpendicularly to the main axis, in particular along a cutting edge, in particular the abovementioned cutting edge. In particular, the first cutting region and the second cutting region each have a maximum length of in particular at least 10 mm, preferably at least 14 mm, particularly preferably at least 16 mm and very particularly preferably of less than 200 mm. Preferably, the first cutting region and the second cutting region extend along the cutting edge jointly along a maximum length which is in particular at least 30%, preferably at least 40% and particularly preferably at least 45%, of a total length of the saw toothing and/or of the cutting edge. An advantageous mass distribution on the cutting arm can be allowed, in particular with a higher mass at an end of the cutting arm that faces away from the main body. Advantageously good damping of the saw tool can be allowed.

Furthermore, it is proposed that the saw tool comprises at least one cutting edge, in particular the abovementioned cutting edge, which extends along a common side of the main body and of the cutting arm and defines an angle of at most 89°, preferably at most 87° and particularly preferably at most 84°, with the main axis in a direction oriented from the main body to the cutting arm. Preferably, the saw toothing is configured such that the cutting edge extends in a straight line along a total maximum length of the cutting edge. In particular, the saw toothing has a main extension axis which is oriented at least substantially parallel to the cutting edge. Preferably, at least a main extension axis of the cutting arm and/or the main extension axis of the saw toothing defines an angle of in particular at most 89°, preferably at most 87° and particularly preferably at most 84°, with the main axis. Preferably, the main extension axis of the cutting arm is oriented at least substantially parallel to the cutting edge. Preferably, the cutting arm extends at least partially in a direction directed away from the connecting region starting from the main body, in particular as seen along the main axis. Particularly preferably, the main extension axis of the cutting arm defines an angle of in particular at least 1°, preferably at least 3° and particularly preferably at least 6°, with an axis, oriented at least substantially perpendicularly to the main axis, through the cutting edge, wherein in particular the cutting arm and/or the cutting edge extend in at least a direction away from the connecting region as seen from the axis oriented at least substantially perpendicularly to the main axis. It is also conceivable, however, for the saw toothing to be configured such that the cutting edge extends at least partially in a curved manner, wherein in particular the main extension axis of the saw toothing defines an angle of in particular at most 89°, preferably at most 87° and particularly preferably at most 84°, with the main axis. Advantageously low loading of the saw tool, in particular of the cutting arm, can be allowed. In particular, as a result of an angled extension of the cutting arm, advantageously easy penetration of the cutting arm into a workpiece to be machined can be allowed. An advantageously long service life of the saw toothing can be allowed.

Furthermore, it is proposed that the cutting arm tapers to a point, in particular within the second cutting region, in a direction away from the main body, in particular from the main axis, wherein the point has an angle of at most 40°, preferably at most 35° and particularly preferably at most 32°, as seen in a main extension plane, in particular the abovementioned main extension plane, of the cutting arm. Preferably, the point is integrally formed on the cutting arm on a side, facing away from the first cutting region, of the second cutting region, in particular along the main extension axis of the cutting arm. Preferably, the cutting edge extends at least substantially entirely along a side, forming the point, of the cutting arm, in particular of the second cutting region. Preferably, the point is integrally formed on the cutting arm on an end, formed transversely to the main axis, of the cutting edge and/or of the saw toothing. Particularly preferably, the point, in particular as seen in the main extension plane of the cutting arm, is formed by at least two sides of the cutting arm, in particular within the second cutting region. Preferably, one of the two sides of the cutting arm defines an angle of in particular at most 89°, preferably at most 87° and particularly preferably at most 84°, with the main axis. Preferably, one of the two sides of the cutting arm, in particular another of the two sides of the cutting arm, preferably a side of the cutting arm that faces away from the cutting edge, defines an angle from the angular range between in particular 40° and 64°, preferably 45° and 60° and particularly preferably 50° and 55°, with the main axis. It is conceivable for the cutting arm to be formed in a ground manner, in particular within the second cutting region, in the region of the point. Advantageously low loading of the cutting arm, in particular in a region of the point, can be allowed. In particular as a result of an angled extension of the point, advantageously easy penetration of the cutting arm into a workpiece to be machined can be allowed.

In addition, it is proposed that the cutting arm tapers to a point, in particular to the abovementioned point, in particular within the second cutting region, at most along half an extent of the second cutting region in a direction away from the main body. Preferably, the cutting arm tapers along a length of the second cutting region, in particular at least substantially parallel to the cutting edge, which corresponds in particular to at most 60%, preferably at most 50% and particularly preferably at most 40%, of a total length of the second cutting region. An advantageous mass distribution on the cutting arm can be allowed, in particular with simultaneously advantageously low loading of the cutting arm, in particular in a region of the point. Advantageously good damping of the saw tool can be allowed. In particular, as a result of an angled extension of the point, advantageously easy penetration of the cutting arm into a workpiece to be machined can be allowed.

Furthermore, it is proposed that the main body, as seen in a main extension plane, in particular the abovementioned main extension plane, of the main body, has at least one side, in particular at least two sides, which is/are formed at least largely with an angle of at least 15°, preferably at least 18° and particularly preferably at least 21°, to the main axis. Preferably, the two sides of the main body are arranged at least substantially parallel to one another as seen in a main extension plane of the main body. Preferably, the main body and/or the cutting arm is/are configured such that, as seen along the main axis, at least one clearance is delimited by the main body and the cutting arm in a direction oriented from the main axis to the point of the cutting arm. In particular, the cutting arm and the main body define an angle of at least 90°, preferably at least 100° and particularly preferably at least 105°, in a region of the clearance. Preferably, a side, facing the connecting region, of the main body on which the connecting region is arranged is oriented at least substantially perpendicularly to the main axis, as seen in particular in the main extension plane of the main body. Preferably, a side, facing the cutting edge, of the main body, on which side the saw toothing is at least partially arranged, defines an angle of at most 89°, preferably at most 87° and particularly preferably at most 84°, with the main axis, as seen in particular in the main extension plane of the main body. Preferably, a minimum spacing between the two sides, formed in particular at least substantially in a parallel manner, of the main body is in particular at least 15 mm, preferably at least 20 mm and particularly preferably at least 25 mm. Preferably, a minimum spacing between an axis extending along a side, facing the cutting arm, of the two sides of the main body and the point of the cutting arm is in particular at least 30 mm, preferably at least 35 mm and particularly preferably at least 37 mm. Preferably, a minimum spacing between an axis extending along a side, facing away from the cutting arm, of the two sides of the main body and an end, arranged on the opposite arm, of the saw toothing is in particular at least 3 mm, preferably at least 4 mm and particularly preferably at least 5 mm. Preferably, the saw tool, in particular the main body, has an at least substantially rounded basic shape, preferably in a transition region to the cutting arm, the opposite arm and/or the connecting region, preferably as seen in the main extension plane of the main body. Preferably, the main body has, as seen in the main extension plane of the main body, at least one contour which has a round shape, for example a shape in the form of a circular arc or of a parabola, in at least one transition region of the main body to the cutting arm, the opposite arm and/or the connecting region, in particular at a distance from the saw toothing. An advantageously high degree of stability of the saw tool can be allowed. In particular as a result of the clearance formed between the main body and the cutting arm, advantageously safe guidance of the saw tool can be allowed. Tilting of the saw tool can advantageously be prevented.

Furthermore, it is proposed that the cutting arm is designed such that the second cutting region and the first cutting region have a mass ratio of at least 1.05, preferably at least 1.075 and particularly preferably at least 1.1. Preferably, the mass ratio of the first cutting region and the second cutting region is formed as the result of a mass of the second cutting region being divided by a mass of the first cutting region. As a result of the mass distribution on the cutting arm, advantageously good damping of the saw tool can be allowed.

Moreover, it is proposed that the main body and the cutting arm have an at least substantially identical maximum length along an axis oriented at least substantially perpendicularly to the main axis, in particular along a cutting edge, preferably the abovementioned cutting edge. In particular, a length ratio of a maximum length of the main body to a maximum length of the cutting arm adopts a value from a range of values between in particular 0.8 and 1.2, preferably 0.9 and 1.1 and particularly preferably 0.95 and 1.05, wherein, in particular, the maximum lengths of the main body and of the cutting arm are formed along an axis oriented at least substantially perpendicularly to the main axis or along the cutting edge. In particular in a configuration of the saw tool with an opposite arm, preferably the main body and the opposite arm together have a maximum length which is at least substantially identical to a maximum length of the cutting arm, wherein in particular the maximum lengths of the main body, of the opposite arm and of the cutting arm are formed along an axis oriented at least substantially perpendicularly to the main axis or along the cutting edge. An advantageously high degree of stability and robustness of the saw tool can be achieved, in particular with regard to forces that act on the saw tool transversely to the main axis.

Furthermore, it is proposed that the cutting arm, in particular the first cutting region and the second cutting region together, has a maximum length of at least 20 mm, preferably at least 30 mm and particularly preferably at least 38 mm, along an axis oriented at least substantially perpendicularly to the main axis, in particular along a cutting edge, preferably the abovementioned cutting edge. Advantageously easy blade guidance can be allowed. As a result of the configuration of the cutting arm, tilting of the saw tool can advantageously be prevented.

The saw tool according to the disclosure is not intended to be limited here to the above-described application and embodiment. In particular, the saw tool according to the disclosure can have a number of individual elements, components and units that differs from a number mentioned herein in order to fulfill a mode of operation described herein. In addition, for the ranges of values specified in this disclosure, values that lie within the mentioned limits are also intended to be disclosed and considered to be usable as desired.

BRIEF DESCRIPTION OF THE DRAWINGS

Further advantages will become apparent from the following description of the drawings. In the drawings, an exemplary embodiment of the disclosure is illustrated. The drawings, the description and the disclosure contain numerous features in combination. A person skilled in the art will expediently also consider the features individually and combine them to form useful further combinations.

In the drawings.

DETAILED DESCRIPTION

Figure 1:
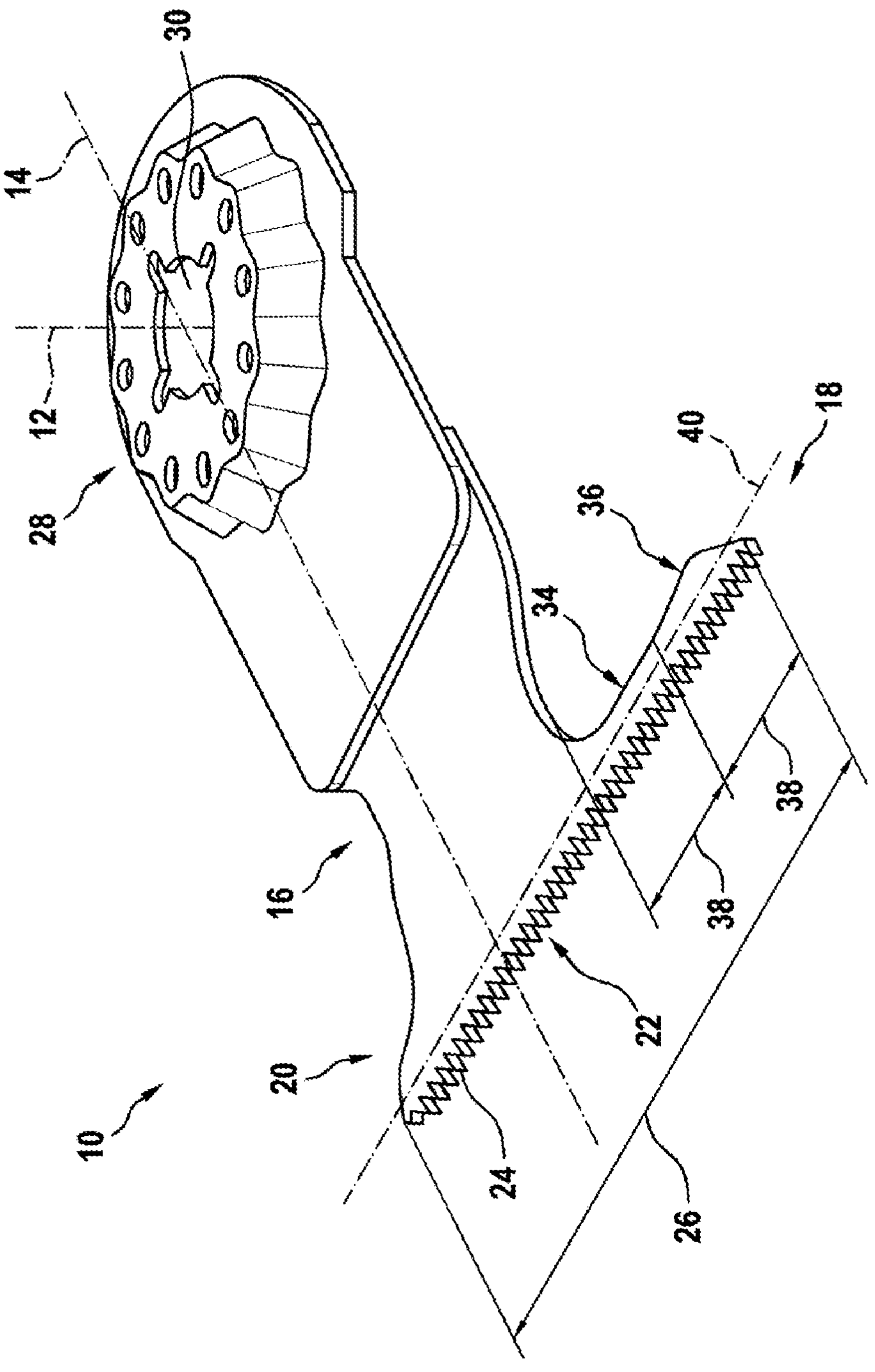
FIG. 1 shows a perspective view of a saw tool according to the disclosure in a schematic illustration.

FIG. 1 shows a saw tool 10 for use with a multifunctional machine tool that is drivable in oscillation and is not illustrated in FIG. 1. The saw tool 10 is intended, in particular in at least one state arranged on the multifunctional machine tool that is drivable in oscillation, to be moved, in particular in oscillation, about or along a drive axis of the multifunctional machine tool that is drivable in oscillation and/or about or along an axis of movement 12 of the saw tool 10. The saw tool 10 has a main axis 14, a main body 16, a cutting arm 18 arranged on the main body 16 transversely to the main axis 14, and an opposite arm 20 arranged on the main body 16 transversely to the main axis 14. The saw tool 10 comprises a saw toothing 22, which is arranged along the main body 16 and the cutting arm 18 and forms a cutting edge 24. The saw toothing 22 extends along a common side of the main body 16, of the opposite arm 20 and of the cutting arm 18. The saw toothing 22 is formed integrally with the main body 16, the cutting arm 18 and the opposite arm 20, in particular welded on, soldered on or introduced into the main body 16, the cutting arm 18 and the opposite arm 20 by means of a subtractive machining process. The saw toothing 22 and the cutting edge 24 extend in a straight line preferably along their entire maximum length. The saw toothing 22 and the common side of the main body 16, of the opposite arm 20 and of the cutting arm 18 have a maximum length 26 of 70 mm. Preferably, the saw toothing 22 is intended to machine, in particular to saw, wood. Other configurations of the saw toothing 22 are also conceivable, however. The saw tool 10 has a connecting region 28 for connecting the saw tool 10 to a saw-tool receptacle of the multifunctional machine tool that is drivable in oscillation. The connecting region 28 is formed integrally with the main body 16, in particular welded on the main body 16. The connecting region 28 is arranged on the main body 16 on a side of the main body that faces away from the cutting arm 18. The connecting region 28 delimits a plurality of recesses 30 which are provided for fastening the saw tool 10 to the saw-tool receptacle. The axis of movement 12 is oriented at least substantially perpendicularly to the main axis 14 and the cutting edge 24 and intersects the main axis at a point within the connecting region 28. Other configurations of the connecting region 28 are also conceivable, however. The main axis 14 is oriented at least substantially parallel to a side of the connecting region 28 that extends from the axis of movement 12 to the main body 16.

The main body 16, the opposite arm 20 and the cutting arm 18 are formed integrally. The cutting arm 18 extends, as seen in the main extension plane of the main body 16, via an edge and/or side face 33, arranged between the connecting region 28 and the saw toothing 22, of the main body 16 in a direction, away from the main axis 14, along the edge and/or side face 33. The cutting arm 18 has, starting from the main axis 14, as seen in the main extension plane of the main body 16, at least substantially perpendicularly to the main axis 14, a greater maximum longitudinal extent than the main body 16, in particular than a region of the main body 16 that is arranged between the cutting arm 18 and the connecting region 28. The cutting arm 18 is arranged at least substantially entirely on exactly one side of the main body 16 and extends in a direction 44 oriented transversely to the main axis 14. The main body 16, the opposite arm 20 and the cutting arm 18 have a common main extension plane. The cutting arm 18 has, as seen in the main extension plane of the main body 16, a side that faces away from the saw toothing 22 and extends in a curved manner. The cutting arm 18 has, starting from the main axis 14, in a direction 44 directed away from the main body 16, in particular extending at least substantially perpendicularly to the main axis 14, a first cutting region 34 and a second cutting region 36, which are arranged one after the other, in particular directly adjoining one another. The second cutting region 36 is arranged on the first cutting region 34 on a side of the first cutting region 34 that faces away from the main body 16, and has a greater mass than the first cutting region 34. The first cutting region 34 and the second cutting region 36 are formed within an extent of the cutting arm 18. The cutting arm 18 is formed entirely by the first cutting region 34 and the second cutting region 36. The saw toothing 22 extends along a common side of the first cutting region 34 and of the second cutting region 36 and along the cutting edge 24 at least substantially transversely to the main axis 14 along at least substantially entire lengths 38 of the first cutting region 34 and of the second cutting region 36. The first cutting region 34 and the second cutting region are arranged along an axis oriented transversely to the main axis 14, as seen in the main extension plane of the main body 16 and of the cutting arm 18. The first cutting region 34 is arranged directly on a side of the main body 16. The second cutting region 36 is arranged, along the axis oriented transversely to the main axis 14, directly on the first cutting region 34 on a side of the first cutting region 34 that faces away from the main body 16. The second cutting region 36 is arranged on the main body 16 only via the first cutting region 34. The first cutting region 34 and the second cutting region 36 are arranged at a distance from the main axis 14, as seen in the main extension plane of the main body 16 and/or of the cutting arm 18, and extend at least substantially entirely in the direction 44 directed away from the main axis 14. The first cutting region 34 and the second cutting region 36 have an at least substantially identical maximum length 38 along the cutting edge 24 and along an axis oriented at least substantially perpendicularly to the main axis 14. Preferably, the first cutting region 34 and the second cutting region 36 extend together, along the cutting edge 24, along a length that amounts to 54% of a total length of the saw toothing 22 and/or of the cutting edge 24. Other configurations of the first cutting region 34 and of the second cutting region 36 are also conceivable, however. The opposite arm 20 extends, as seen in the main extension plane of the main body 16, via an edge and/or side face 45, arranged between the connecting region 28 and the saw toothing 22, of the main body 16, in a direction, away from the main axis 14, along the edge and/or side face 45. The opposite arm 20 has, starting from the main axis 14, as seen in the main extension plane of the main body 16, at least substantially perpendicularly to the main axis 14, a smaller maximum longitudinal extent than the main body 16, in particular than a region of the main body 16 that is arranged between the cutting arm 18 and the connecting region 28. The opposite arm 20 and the cutting arm 18 extend from the main body 16 in opposite directions. The opposite arm has a maximum length that corresponds to 14% of a total length of the cutting arm 18 along the cutting edge 24, in particular along a main extension axis of the opposite arm 20. Other configurations of the opposite arm 20 are also conceivable, however.

Figure 2:
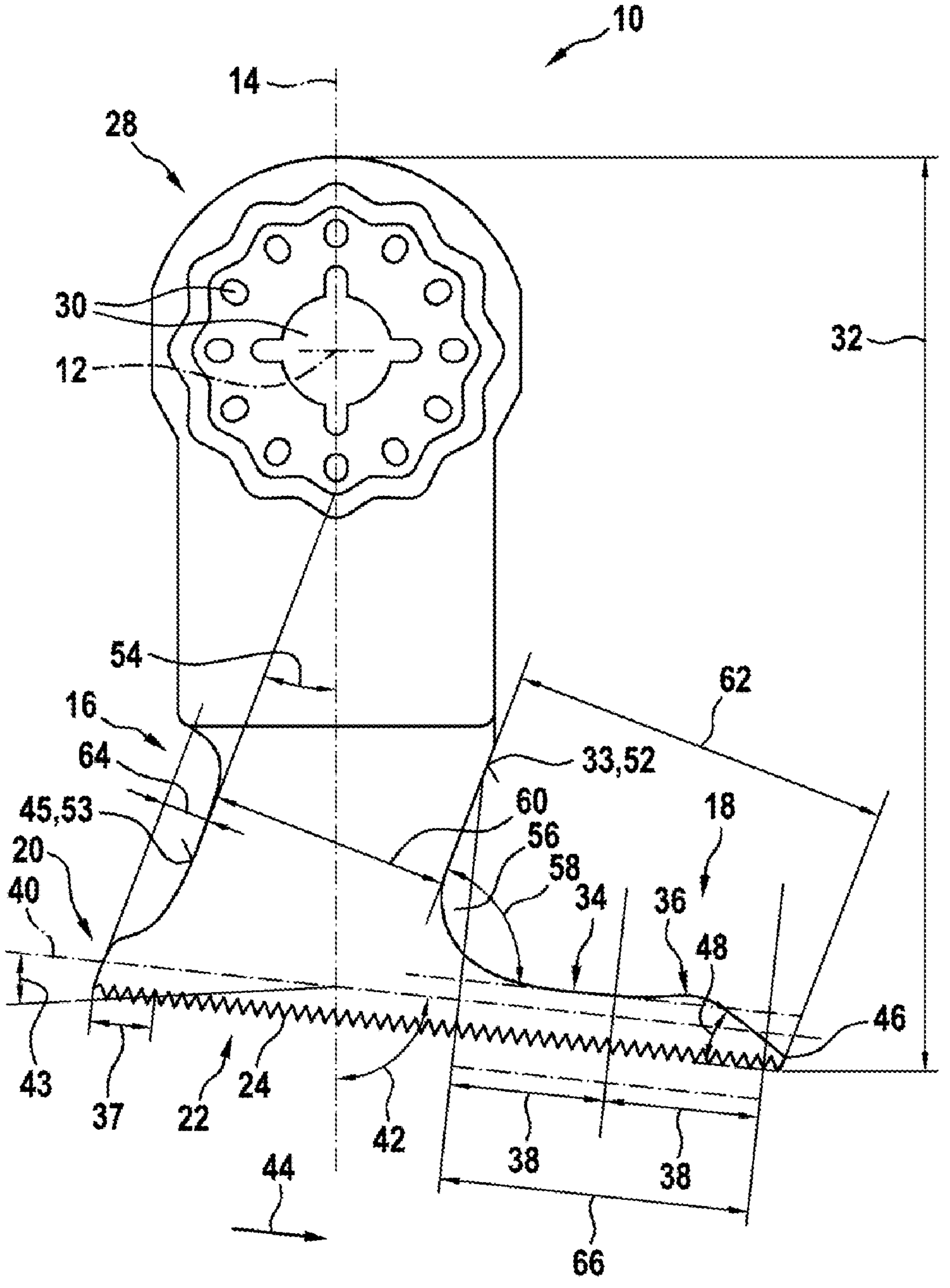
FIG. 2 shows a schematic illustration of the saw tool according to the disclosure as seen perpendicularly to a main extension plane of the saw tool.

FIG. 2 shows the saw tool 10 in a view perpendicular to a main extension plane of the saw tool 10. The saw tool has a maximum longitudinal extent 32, oriented at least substantially parallel to the main axis 14, of 87 mm. The opposite arm 20 has, along the cutting edge 24, a maximum length 37 of 5.18 mm. The first cutting region 34 and the second cutting region 36 each have a maximum length 38 of 19 mm. The cutting arm 18 has, within the second cutting region 36, a greater maximum transverse extent, along at least one axis oriented at least substantially perpendicularly to a main extension axis 40 of the cutting arm 18 and/or along the cutting edge 24, than in the first cutting region 34. The cutting arm 18 is configured such that the second cutting region 36 and the first cutting region 34 have a mass ratio of 1.1. The cutting edge 24 extends along the common side of the main body 16 and of the cutting arm 18, in particular of the opposite arm 20, and defines an angle 42 of 84° with the main axis 14. The saw toothing 22 has a main extension axis which is oriented at least substantially parallel to the cutting edge 24. Preferably, the main extension axis 40 of the cutting arm 18 and/or the main extension axis of the saw toothing 22 defines an angle 42 of 84° with the main axis 14. The main extension axis 40 of the cutting arm 18 is oriented at least substantially parallel to the cutting edge 24. The main extension axis 40 of the cutting arm 18 defines an angle 43 of 6° with an axis, oriented at least substantially perpendicularly to the main axis 14, through the cutting edge 24, wherein the cutting arm 18 and the cutting edge 24 extend, as seen from the axis oriented at least substantially perpendicularly to the main axis 14, in at least one direction 44 away from the connecting region 28. The cutting arm 18 tapers to a point 46 within the second cutting region 36 in a direction 44 away from the main body 16 and the main axis 14, wherein the point 46 has an angle 48 of 32° as seen in the main extension plane of the cutting arm 18. The point 46 is integrally formed on the cutting arm 18 on a side of the second cutting region 36 that faces away from the first cutting region 34. The cutting edge 24 extends at least substantially entirely along a side, forming the point 46, of the cutting arm 18, in particular of the second cutting region 36. The point 46 is integrally formed on the cutting arm 18 on an end of the cutting edge 24 and/or of the saw toothing 22 that is formed transversely to the main axis 14. The point 46 is formed by two sides of the cutting arm 18 within the second cutting region 36, as seen in the main extension plane of the cutting arm 18. A side, facing away from the cutting edge 24, of the two sides of the cutting arm 18 defines an angle of 52° with the main axis 14. Other configurations of the cutting arm 18 are also conceivable, however.

The main body 16 has, as seen in the main extension plane of the main body 16, two sides 52, 53, which are formed at least largely with an angle 54 of 21° to the main axis 14. The two sides 52, 53 of the main body 16 are arranged at least substantially parallel to one another as seen in a main extension plane of the main body 16. The main body 16 and the cutting arm 18 are configured such that, as seen along the main axis 14, a clearance 56 is delimited by the main body 16 and the cutting arm 18 in a direction oriented from the main axis 14 to the point 46 of the cutting arm 18. The cutting arm 18 and the main body 16 define an angle 58 of 105° in a region of the clearance 56. A side, facing the connecting region 28, of the main body 16 on which the connecting region 28 is arranged is oriented at least substantially perpendicularly to the main axis 14 as seen in the main extension plane of the main body 16. A side 52, 53, facing the cutting edge 24, of the main body 16, on which side the saw toothing 22 is at least partially arranged, defines an angle 42 of 84° with the main axis 14 as seen in the main extension plane of the main body 16. A minimum spacing 60 between the two sides 52, 53, arranged at least substantially parallel to one another, of the main body 16 is 25 mm. A minimum spacing 62 between an axis extending along a side 52, facing the cutting arm 18, of the two sides 52, 53 of the main body 16 and the point 46 of the cutting arm 18 is 37 mm. A minimum spacing 64 between an axis extending along a side 53, facing away from the cutting arm 18, of the two sides 52, 53 of the main body 16 and an end, arranged on the opposite arm 20, of the saw toothing 22 is 5 mm. The main body 16 has a rounded basic shape in a transition region to the cutting arm 18, the opposite arm 20 and the connecting region 28 as seen in the main extension plane of the main body 16. The main body 16 has, as seen in the main extension plane of the main body 16, a contour which has a shape in the form of a circular arc, in transition regions, formed at a distance from the saw toothing 22, to the cutting arm 18, the opposite arm 20 and the connecting region 28. Other configurations of the main body 16 are also conceivable, however.

The main body 16 and the cutting arm 18 have an at least substantially identical maximum length along an axis oriented at least substantially perpendicularly to the main axis 14 and along the cutting edge 24. A length ratio of a maximum length of the main body 16 to a maximum length of the cutting arm 18 adopts a value of 0.9, wherein in particular the maximum lengths of the main body 16 and of the cutting arm 18 are formed along an axis oriented at least substantially perpendicularly to the main axis 14 or along the cutting edge 24. The cutting arm 18, in particular the first cutting region 34 and the second cutting region 36 together, has a maximum length 66 of 38 mm along an axis oriented at least substantially perpendicularly to the main axis 14, in particular along the cutting edge 24.

Figure 3:
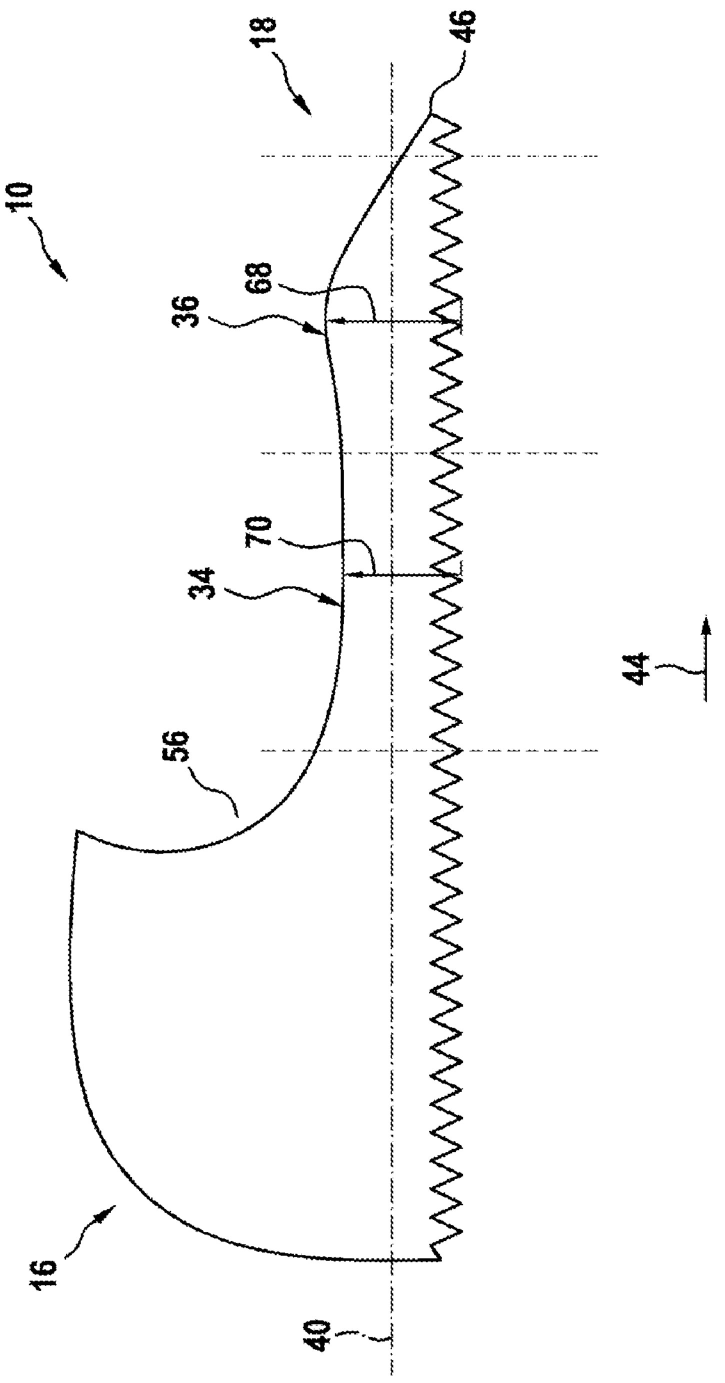
FIG. 3 shows a schematic illustration of a detail view in the region of a cutting arm of the saw tool according to the disclosure.

FIG. 3 shows a detail view of the saw tool 10 in the region of the cutting arm 18. The cutting arm 18 has a greater maximum transverse extent, in particular maximum blade width, within the second cutting region 36, along at least one axis oriented at least substantially parallel to the main axis 14, than in the first cutting region 34. A protuberance defines the maximum blade width 68 of the second cutting region 36, which is 6.3 mm. A minimum blade width 70 of the first cutting region 34 is 5.4 mm. Preferably, at least the connecting region 28, which is in particular not shown in FIG. 3, the main body 16 and/or the cutting arm 18 is/are formed at least largely from at least one material, which is in particular in the form of a metal. The cutting arm 18 is formed, in the second cutting region 36, at least partially from a further material which has a higher density than the material of the first cutting region 34. The cutting arm 18 tapers to the point 46 within the second cutting region 36 along half an extent of the second cutting region 36 in a direction 44 away from the main body 16.

Figure 4:
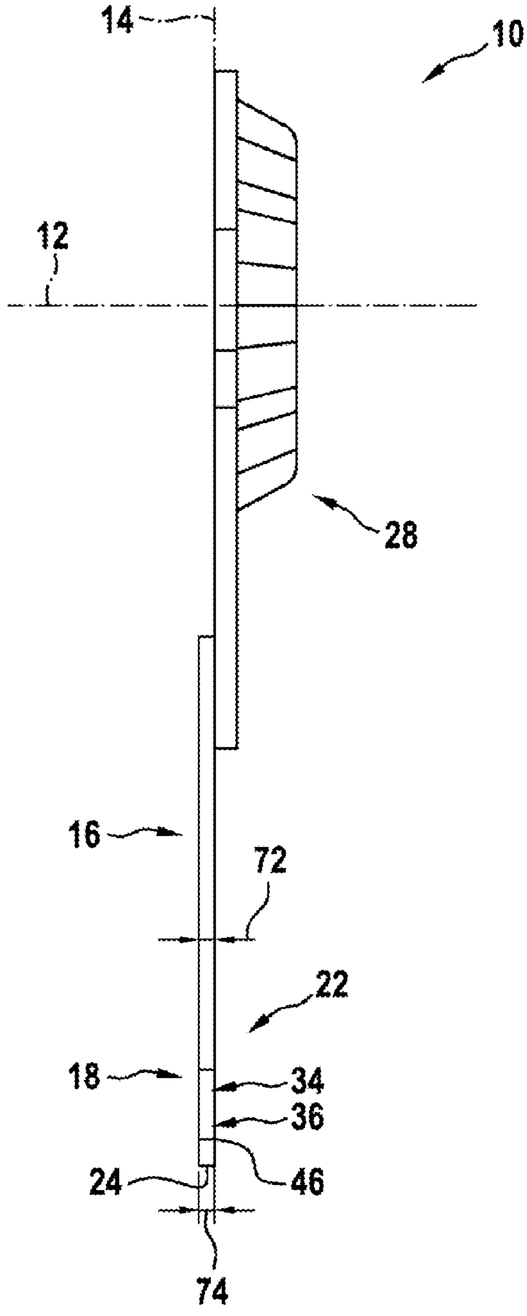
FIG. 4 shows a schematic illustration of the saw tool according to the disclosure in a side view along the main extension plane.

FIG. 4 shows a side view of the saw tool 10, in particular along the main extension plane of the main body 16 and at least substantially perpendicularly to the main axis 14. The main body 16 has a maximum thickness 72 of 1 mm at least substantially perpendicularly to the main axis 14 and/or to the common side of the main body 16 and of the cutting arm 18. The saw toothing 22 has a maximum thickness 74 of 1.35 mm at least substantially perpendicularly to the main axis 14 and/or to the common side of the main body 16 and of the cutting arm 18. The cutting arm 18 has a maximum thickness 72 of 1 mm within the first cutting region 34 and the second cutting region at least substantially perpendicularly to the main axis 14 and to the common side of the main body 16 and of the cutting arm 18. The cutting arm 18 has a greater maximum thickness within the second cutting region 36, along at least one axis oriented at least substantially perpendicularly to the main axis 14 and the cutting edge of the saw toothing 22, than in the first cutting region 34. It is conceivable for the cutting arm 18 to be configured such that a thickness of the cutting arm 18 within the second cutting region 36 decreases at least partially, as seen along the cutting edge 24, toward an end facing away from the first cutting region 34, in particular toward an end facing the point 46, of the second cutting region 36.

The invention claimed is:

1. A saw blade for use with a multifunctional machine tool that is drivable in oscillation, comprising:

- a connecting region configured to connect to the multifunctional machine tool such that an axis of movement of the saw blade extends through the connecting region;
- a main axis;
- a main body defining a first main extension plane that is at least substantially perpendicular to the axis of movement; and
- at least one cutting arm arranged on the main body transversely to the main axis, wherein the at least one cutting arm has, starting from the main axis, in a direction directed away from the main body and extending at least substantially perpendicularly to the main axis, a first cutting region and a second cutting region which are arranged one after the other, so as to directly adjoin one another, wherein the second cutting region is arranged relative to the first cutting region on a side of the first cutting region that faces away from the main body, and the second cutting region has a greater mass than the first cutting region, and wherein the first main extension plane of the main body and a second main extension plane of the cutting arm form a common main extension plane.

2. The saw blade as claimed in claim 1, wherein:

the first cutting region has a first maximum transverse extent defined along a first axis that is oriented at least substantially perpendicularly to a main extension axis of the at least one cutting arm, and the second cutting region has a second maximum transverse extent defined along the first axis, the second maximum transverse extent being greater than the first maximum transverse extent.

3. The saw blade as claimed in claim 1, wherein:

the first cutting region has a first maximum length defined along a first axis that extends along a cutting edge of the saw blade and that is oriented at least substantially perpendicularly to the main axis, and the second cutting region has a second maximum length defined along the axis that is at least substantially identical to the first maximum length.

4. The saw blade as claimed in claim 1, wherein:

at least one cutting edge extends along a common side of the main body and of the at least one cutting arm, and the at least one cutting edge has saw toothing having a main extension axis that defines an angle of at most 89° with the main axis.

5. The saw blade as claimed in claim 1, wherein:

in the second cutting region, the at least one cutting arm tapers, in a direction away from the main body, to a point and the point has an angle of at most 40° as defined in a second main extension plane of the at least one cutting arm.

6. The saw blade as claimed in claim 1, wherein the at least one cutting arm includes a tapered region at which the at least one cutting arm tapers to a point, the tapered region being located within the second cutting region and extending along, at most, half of an extent of the second cutting region defined in a direction away from the main body.

7. The saw blade as claimed in claim 1, wherein the main body has at least two sides delimiting opposite sides of the main body in the first main extension plane, the at least two sides being arranged at an angle of at least 15° relative to the main axis.

8. The saw blade as claimed in claim 1, wherein the at least one cutting arm is configured such that a mass ratio of a second mass of the second cutting region to a first mass of the first cutting region is at least 1.05.

9. The saw blade as claimed in claim 1, wherein:

the main body has a first maximum length measured along a first axis that is oriented at least substantially perpendicularly to the main axis and runs along a cutting edge, the at least one cutting arm has a second maximum length measured along the first axis, and a ratio between the first maximum length and the second maximum length is between 0.8 and 1.2.

10. The saw blade as claimed in claim 1, wherein the first cutting region and the second cutting region s have a combined maximum length of at least 20 cm along an axis that is oriented at least substantially perpendicularly to the main axis and that runs along a cutting edge of the saw blade.

11. The saw blade as claimed in claim 1, wherein the main axis intersects and is oriented at least substantially perpendicularly to the axis of movement.

12. The saw blade as claimed in claim 1, wherein the first and second cutting regions form a cutting edge that extends in a straight line.

13. The saw blade as claimed in claim 12, wherein a back side of the cutting arm opposite the cutting edge includes a first cutting region portion in the first cutting region and second cutting edge region portion in the second cutting region forming a protuberance that projects away from the cutting edge such that a nominal width of the second cutting region measured perpendicular to the cutting edge at the protuberance is greater than a nominal width of the first cutting region adjacent to the second cutting region.

* * * * *